(12) United States Patent
Stenger

(10) Patent No.: US 10,652,623 B1
(45) Date of Patent: May 12, 2020

(54) DISPLAY TIMING DETERMINATION DEVICE, DISPLAY TIMING DETERMINATION METHOD, AND PROGRAM

(71) Applicant: Rakuten, Inc., Tokyo (JP)

(72) Inventor: Bjorn Stenger, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 142 days.

(21) Appl. No.: 16/080,306

(22) PCT Filed: Sep. 8, 2016

(86) PCT No.: PCT/JP2016/076466
§ 371 (c)(1),
(2) Date: Aug. 28, 2018

(87) PCT Pub. No.: WO2018/047275
PCT Pub. Date: Mar. 15, 2018

(51) Int. Cl.
| | |
|---|---|
| H04N 5/04 | (2006.01) |
| H04N 21/488 | (2011.01) |
| H04N 21/439 | (2011.01) |
| G06T 11/60 | (2006.01) |
| G06F 3/16 | (2006.01) |

(52) U.S. Cl.
CPC .......... H04N 21/4884 (2013.01); G06F 3/16 (2013.01); G06T 11/60 (2013.01); H04N 21/439 (2013.01)

(58) Field of Classification Search
CPC .......... H04N 5/04; H04N 5/60; H04N 7/0882; H04N 7/0885; H04N 21/4307; H04N 21/4305; H04N 21/233; H04N 21/4394; H04N 21/4331; H04N 21/435; H04N 21/2368; H04N 21/4884; H04N 21/4341

USPC ....... 348/515, 512, 462, 467, 468, 480–485; 725/18, 40, 32, 42, 137
See application file for complete search history.

(56) References Cited

U.S. PATENT DOCUMENTS

2007/0211168 A1* 9/2007 Ko .................. H04N 5/44513
348/462

FOREIGN PATENT DOCUMENTS

| JP | 2005-286969 A | 10/2005 |
|---|---|---|
| JP | 2008-172421 A | 7/2008 |
| JP | 2010-015088 A | 1/2010 |

OTHER PUBLICATIONS

English translation of the International Search Report for PCT/JP2016/076466 dated Dec. 6, 2016.

* cited by examiner

*Primary Examiner* — Sherrie Hsia
(74) *Attorney, Agent, or Firm* — HEA Law PLLC

(57) ABSTRACT

Voice storage data acquisition means of a display timing determination device acquires voice storage data storing a plurality of voices to be output sequentially. Timing data acquisition means acquires timing data on provisional display timings of a plurality of pieces of character information, which are to be sequentially displayed during reproduction of the voice storage data and represent content of the respective voices. Waveform analysis means analyzes a voice waveform of the voice storage data to acquire an output timing of each of the voices. Display timing determination means determines a definitive display timing of each of the pieces of character information based on the output timing of each of the voices acquired by the waveform analysis means and the provisional display timings of the respective pieces of character information determined based on the timing data.

11 Claims, 10 Drawing Sheets

FIG.4

| CHARACTER INFORMATION ID | START TIMING | END TIMING | DISPLAY TIME | CHARACTER INFORMATION |
|---|---|---|---|---|
| 1 | 0:01:26 | 0:01:29 | 0:00:03 | Hi! I'm Tom. |
| 2 | 0:01:35 | 0:01:40 | 0:00:05 | Nice to meet you. |
| 3 | 0:01:50 | 0:01:53 | 0:00:03 | Nice to meet you, too. |
| 4 | 0:02:02 | 0:02:08 | 0:00:06 | I'm Michel. |
| 5 | 0:02:15 | 0:02:20 | 0:00:05 | CIA |
| ... | ... | ... | ... | ... |

DISPLAY TIMING DETERMINATION DEVICE, DISPLAY TIMING DETERMINATION METHOD, AND PROGRAM

CROSS REFERENCE TO RELATED APPLICATIONS

This application is a National Stage of International Application No. PCT/JP2016/076466 filed on Sep. 8, 2016. The contents of the above document is incorporated herein by reference in its entirety.

TECHNICAL FIELD

The present invention relates to a display timing determination device, a display timing determination method, and a program.

BACKGROUND ART

Hitherto, there has been known a technology of displaying character information (e.g., subtitles) representing each voice every time the voice is output during reproduction of voice storage data (e.g., moving image data) storing a plurality of voices to be output sequentially.

For example, in Patent Literature 1, there is described a system configured to create character information representing voices of a cast and provide viewers with the character information in a live TV program. In this system, a TV editor who has heard a voice in the live program manually creates characters. Thus, even when an interval between timings of outputting voices and an interval between timings of displaying pieces of character information are roughly synchronized with each other, the display timing of a piece of character information is delayed overall relative to the output timing of a voice by a period of time required for manually inputting characters. In this respect, in the technology of Patent Literature 1, when a live TV program is recorded, the delay time is estimated based on a genre code of the TV program, and the display timing of a character is changed overall to an earlier time at the time of recording by a delay time that depends on the genre code.

CITATION LIST

Patent Literature

[PTL 1] JP 2008-172421 A

SUMMARY OF INVENTION

Technical Problem

However, in the technology of Patent Literature 1, the delay time is estimated through use of the genre code of a TV program, and thus the output timing of a voice and the display timing of a character cannot be synchronized with each other without the genre code. Further, the delay time of the display timing of a character relative to the output timing of a voice is different depending on, for example, the complexity of content represented by a voice or the skill of a TV editor who inputs characters. Thus, even when the genre code is used, the output timing of a voice and the display timing of a character may not be synchronized with each other accurately.

The present invention has been made in view of the above-mentioned problem, and it is an object of the present invention to synchronize the output timing of a voice and the display timing of a character with each other.

Solution to Problem

In order to solve the above-mentioned problem, a display timing determination device according to one embodiment of the present invention includes: voice storage data acquisition means for acquiring voice storage data storing a plurality of voices to be output sequentially; timing data acquisition means for acquiring timing data on provisional display timings of a plurality of pieces of character information, which are to be sequentially displayed during reproduction of the voice storage data and represent content of the respective plurality of voices; waveform analysis means for analyzing a voice waveform of the voice storage data to acquire an output timing of each of the plurality of voices; and display timing determination means for determining a definitive display timing of each of the plurality of pieces of character information based on the output timing of each of the plurality of voices acquired by the waveform analysis means and the provisional display timings of the respective plurality of pieces of character information determined based on the timing data.

A display timing determination method according to one embodiment of the present invention includes: a voice storage data acquisition step of acquiring voice storage data storing a plurality of voices to be output sequentially; a timing data acquisition step of acquiring timing data on provisional display timings of a plurality of pieces of character information, which are to be sequentially displayed during reproduction of the voice storage data and represent content of the respective plurality of voices; a waveform analysis step of analyzing a voice waveform of the voice storage data to acquire an output timing of each of the plurality of voices; and a display timing determination step of determining a definitive display timing of each of the plurality of pieces of character information based on the output timing of each of the plurality of voices acquired in the waveform analysis step and the provisional display timings of the respective plurality of pieces of character information determined based on the timing data.

A program according to one embodiment of the present invention causes a computer to function as: voice storage data acquisition means for acquiring voice storage data storing a plurality of voices to be output sequentially; timing data acquisition means for acquiring timing data on provisional display timings of a plurality of pieces of character information, which are to be sequentially displayed during reproduction of the voice storage data and represent content of the respective plurality of voices; waveform analysis means for analyzing a voice waveform of the voice storage data to acquire an output timing of each of the plurality of voices; and display timing determination means for determining a definitive display timing of each of the plurality of pieces of character information based on the output timing of each of the plurality of voices acquired by the waveform analysis means and the provisional display timings of the respective plurality of pieces of character information determined based on the timing data.

Further, an information storage medium according to one embodiment of the present invention is a computer-readable information storage medium having the above-mentioned program stored thereon.

Further, in one aspect of the present invention, the display timing determination means is configured to: acquire a plurality of change amounts of the provisional display timings of the plurality of pieces of character information; acquire, for each of the plurality of change amounts, match degree information on a degree of matching between each of the provisional display timings of the plurality of pieces of character information, which are obtained by being changed by the each of the plurality of change amounts, and the output timing of each of the plurality of voices; and determine the definitive display timing of each of the plurality of pieces of character information based on one of the plurality of change amounts having a highest degree of matching indicated by the match degree information.

Further, in one aspect of the present invention, the display timing determination means is configured to: acquire, for each of the plurality of pieces of character information, an individual piece of match degree information on a degree of matching between a provisional display timing of each of the plurality of pieces of character information and the output timing closest to the provisional display timing; and determine the definitive display timing of each of the plurality of pieces of character information based on the individual piece of match degree information acquired for each of the plurality of pieces of character information.

Further, in one aspect of the present invention, the plurality of pieces of character information contain character information indicating information other than a voice, and the display timing determination means is configured to exclude the character information indicating information other than a voice from an acquisition target of the individual piece of match degree information.

Further, in one aspect of the present invention, the display timing determination means is configured to: acquire, for each of the plurality of voices, an individual piece of match degree information indicating a degree of matching between an output timing of the each of the plurality of voices and a provisional display timing of one of the plurality of pieces of character information closest to the output timing; and determine the definitive display timing of each of the plurality of pieces of character information based on the individual piece of match degree information acquired for each of the plurality of voices.

Further, in one aspect of the present invention, the voice storage data further stores a voice that does not have a corresponding piece of character information, and the display timing determination means is configured to exclude the voice that does not have a corresponding piece of character information from an acquisition target of the individual piece of match degree information.

Further, in one aspect of the present invention, the voice storage data stores a plurality of sounds including the plurality of voices and a sound other than a voice, the waveform analysis means is configured to acquire an output timing of each of the plurality of sounds stored in the voice storage data, and the display timing determination means is configured to: acquire, for each of the plurality of sounds, probability information on a probability that the each of the plurality of sounds is a voice; and determine the definitive display timing of each of the plurality of pieces of character information based additionally on the probability information acquired for each of the plurality of sounds.

Further, in one aspect of the present invention, the display timing determination means is capable of repeatedly acquiring a change amount of the provisional display timings of the plurality of pieces of character information, and the display timing determination means is configured to: acquire, for each change amount, overall match degree information indicating a degree of overall match between the provisional display timings of the plurality of pieces of character information, which are obtained by being changed by the each change amount, and output timings of the respective plurality of voices; acquire a new change amount when a difference between the overall match degree information having a highest degree of matching and the overall match degree information having a second highest degree of matching is smaller than a threshold value; and determine, when the difference is equal to or larger than the threshold value, without acquiring the new change amount, the definitive display timing of each of the plurality of pieces of character information based on a change amount corresponding to the overall match degree information having a lowest degree of matching.

Further, in one aspect of the present invention, the display timing determination device further includes: voice speaker information acquisition means for acquiring voice speaker information on a speaker corresponding to each of the plurality of voices; and character-information speaker information acquisition means for acquiring character-information speaker information on a speaker corresponding to each of the plurality of pieces of character information, and the display timing determination means is configured to determine the definitive display timing of each of the plurality of pieces of character information based additionally on the voice speaker information on each of the plurality of voices and the character-information speaker information on each of the plurality of pieces of character information.

Advantageous Effects of Invention

According to the present invention, and it is possible to synchronize the output timing of a voice and the display timing of a character with each other.

BRIEF DESCRIPTION OF DRAWINGS

FIG. 4 is a table for showing an example of storing timing data.

DESCRIPTION OF EMBODIMENTS

1. Hardware Configuration of Display Timing Determination System

Figure 1:
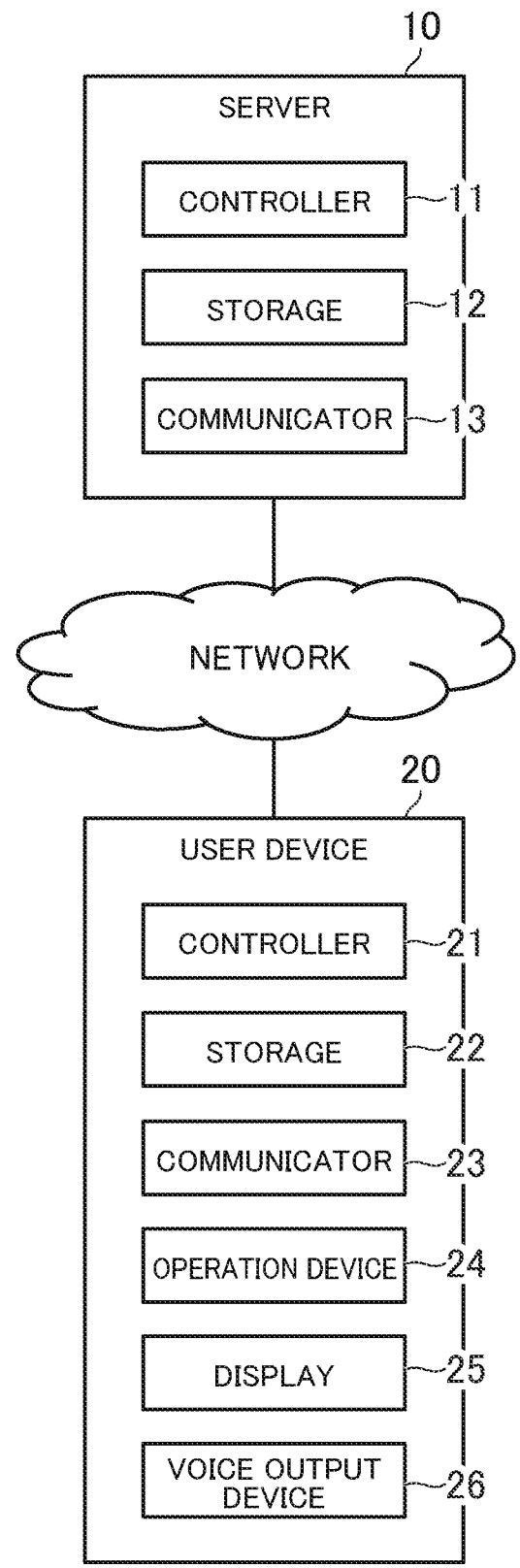
FIG. 1 is a diagram for illustrating an overall configuration of a display timing determination system.

In the following, a description is given of an example of a display timing determination system including a server, which is a display timing determination device according to an exemplary embodiment of the present invention. FIG. 1 is a diagram for illustrating an overall configuration of the display timing determination system. As illustrated in FIG. 1, the display timing determination system 1 includes a server 10 and a user device 20. Those devices may be communicably connected to each other via a network in a wired or wireless manner.

The server 10 is a server computer, and includes, for example, a controller 11, a storage 12, and a communicator 13. The controller 11 includes at least one processor. The controller 11 is configured to execute processing in accordance with a program and data stored in the storage 12. The storage 12 includes a main memory and an auxiliary storage. For example, the main memory is a volatile memory, for example, a RAM, and the auxiliary storage is a non-volatile memory such as a hard disk drive or a flash memory. The communicator 13 includes a communication interface for wired communication or wireless communication, and communicates data via a network, for example.

The user device 20 is a computer to be operated by a user, and is, for example, a personal computer, a portable information terminal (including tablet computer), or a cell phone (including smartphone). The user device 20 includes a controller 21, a storage 22, a communicator 23, an operation device 24, a display 25, and a voice output device 26. Hardware configurations of the controller 21, the storage 22, and the communicator 23 may be the same as those of the controller 11, the storage 12, and the communicator 13, respectively.

The operation device 24 is an input device for operation by the user, and is, for example, a pointing device such as a touch panel or a mouse, or a keyboard. The operation device 24 transmits operation content of the user to the controller 21. The display 25 is, for example, a liquid crystal display or an organic EL display, and can display various images such as a moving image and a still image. The voice output device 26 is, for example, a speaker, and can output various voices.

Programs and data to be described as being stored in the storages 12 and 22 may be supplied thereto via a network. Further, hardware configurations of the server 10 and the user device 20 are not limited to the above-mentioned example, and various kinds of pieces of computer hardware may be employed. For example, the server 10 and the user device 20 may each include a reader (e.g., optical disc drive or memory card slot) configured to read a computer-readable information storage medium, and an input/output device (e.g., USB port and image input/output terminal) for directly connecting to an external device. In this case, programs and data stored in the information storage medium may be supplied to the server 10 or the user device 20 via the reader or the input/output device.

In this embodiment, the server 10 is configured to manage a plurality of moving images. For example, when the user designates a moving image that the user wishes to view, the user can view the moving image by downloading or streaming thereof. When the moving image is reproduced by the user device 20, subtitles are displayed on the display 25 together with the moving image, and voices of the moving image are output by the voice output device 26.

Figure 2:
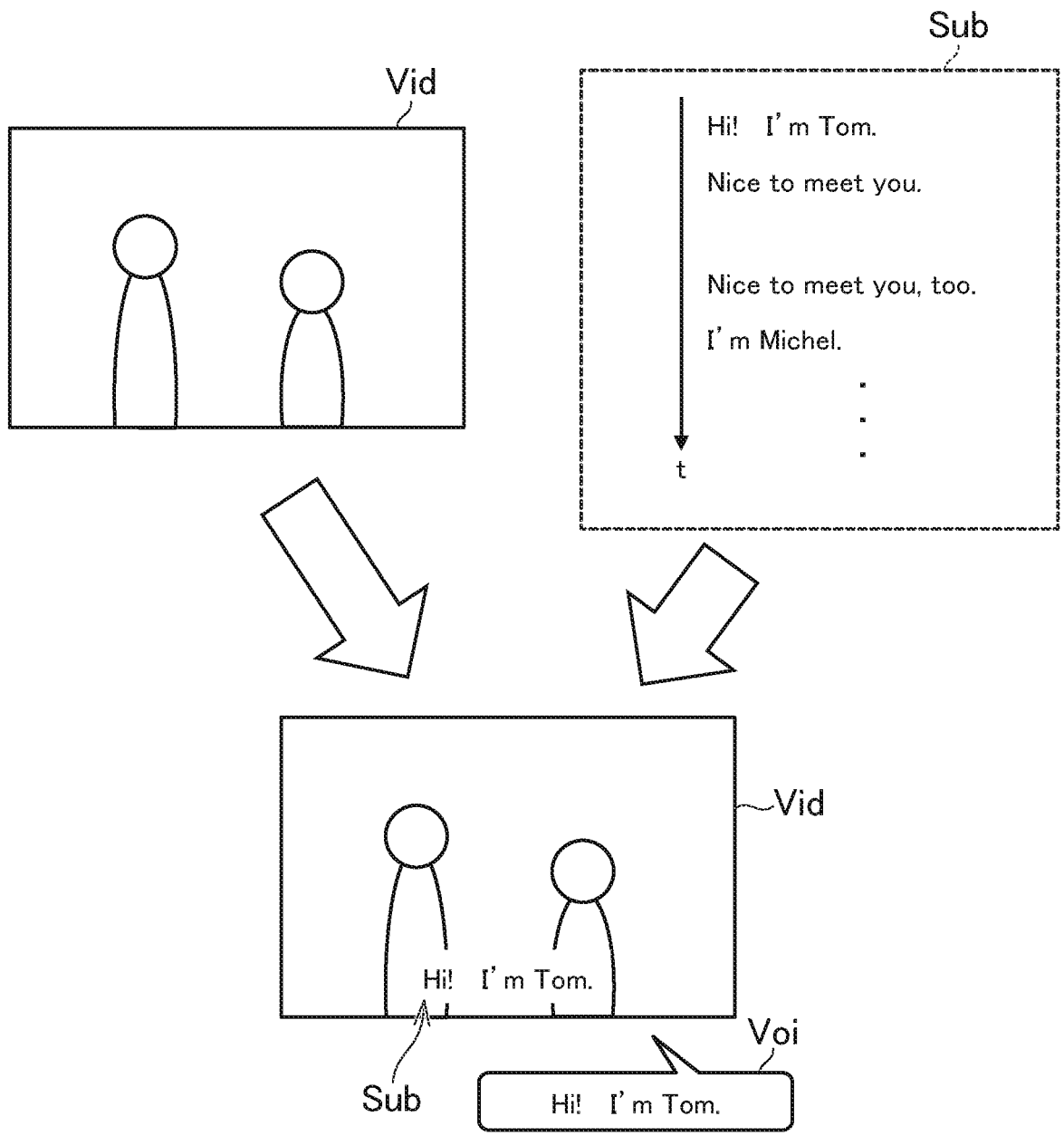
FIG. 2 is a diagram for illustrating an outline of processing to be executed when a moving image is reproduced.

FIG. 2 is a diagram for illustrating an outline of processing to be executed when a moving image is reproduced. In FIG. 2, the moving image is denoted by a symbol Vid, the voice of the moving image is denoted by a symbol Voi, and the subtitle is denoted by a symbol Sub. As illustrated in FIG. 2, the server 10 manages pieces of data on the moving image Vid and the subtitle Sub separately. The t-axis of the subtitle Sub illustrated in FIG. 2 is a time axis. In the subtitle Sub of FIG. 2, subtitles to be displayed on a screen are illustrated in a chronological order.

In this embodiment, the subtitle Sub is not managed under a state of being embedded into the moving image Vid, but is managed separately from the moving image Vid. When the moving image Vid is displayed, as illustrated in FIG. 2, the moving image Vid and the subtitle Sub are combined. With this, when the voice Voi of the moving image is output, the subtitle Sub corresponding to the voice Voi is displayed. For example, the server 10 transmits data on the moving image Vid and data on the subtitle Sub separately to the user device 20, and the user device 20 combines the subtitle Sub and the moving image Vid. Further, for example, the server 10 combines the subtitle Sub and the moving image Vid designated by the user, and transmits data on the moving image Vid obtained by the combination to the user device 20.

The subtitle Sub is created by any method at any timing before or after registration of the moving image Vid with the server 10. For example, a system administrator may manually input text of the subtitle Sub and the display timing of the subtitle Sub while viewing the moving image Vid. The output timing of a voice and the display timing of the subtitle Sub may not be synchronized with each other when the subtitle Sub has been newly created, that is, a certain amount of deviation in timing is allowed. However, it is assumed that the order of outputting each voice and the order of displaying each subtitle Sub match each other, and an interval between output timings and an interval between display timings are roughly synchronized with each other.

The server 10 in this embodiment analyzes a voice waveform of the moving image Vid to acquire the output timing of each voice in the moving image Vid. Then, the server 10 adjusts the display timing of each subtitle Sub, and at the same time, compares the display timing of each subtitle Sub with the output timing of each voice obtained by analysis of the voice waveform to find a display timing that achieves the best match in timing. In this manner, the output timing of each voice and the display timing of each subtitle Sub are synchronized with each other. In the following, details of this technology are described. In the following description, reference symbols assigned to the moving image, the voice, and the subtitle in FIG. 2 are omitted.

2. Functions Implemented in this Embodiment

Figure 3:
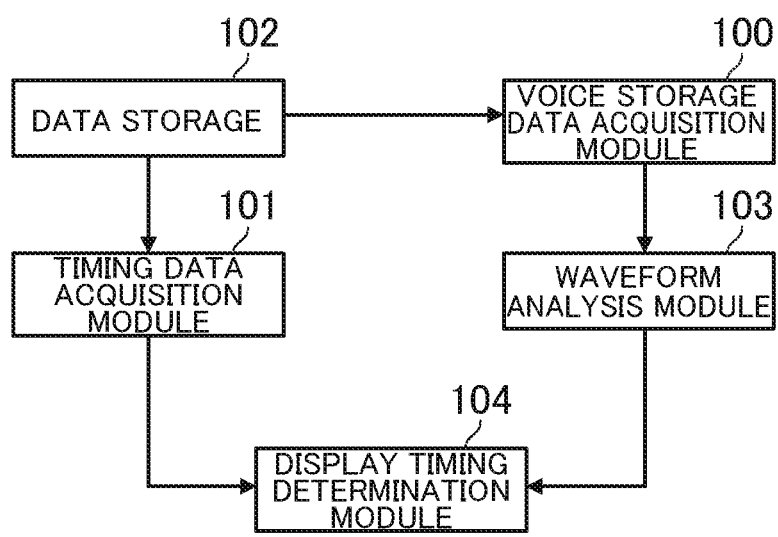
FIG. 3 is a functional block diagram for illustrating an example of functions to be implemented by the display timing determination system.

FIG. 3 is a functional block diagram for illustrating an example of functions to be implemented by the display timing determination system 1. As illustrated in FIG. 3, in this embodiment, a voice storage data acquisition module 100, a timing data acquisition module 101, a data storage 102, a waveform analysis module 103, and a display timing determination module 104 are implemented in the server 10.

2-1. Voice Storage Data Acquisition Module

The controller 11 mainly implements the voice storage data acquisition module 100. The voice storage data acquisition module 100 is configured to acquire voice storage data storing a plurality of voices to be output sequentially. In this embodiment, a description is given of a case in which the voice storage data acquisition module 100 acquires the voice storage data from the data storage 102 described later, but when the voice storage data is stored in a computer other than the server 10, the voice storage data may be acquired from the computer.

The voice may be obtained by collecting sounds actually uttered by a person with a microphone, or may be a voice artificially synthesized by a computer. A period of time in which the voice storage data is reproduced (period from start of reproduction to end of reproduction) contains a plurality of periods in which respective voices are output. Each voice can be said to be a set of voices to be output in a certain period. The voice may contain at least one word, or may be divided in unit of sentences or formed of a plurality of sentences. Further, the voice may be a shout or a scream, which does not particularly contain a meaningful word. For example, the voice may be an individual line in, for example, a movie, a drama, or an animation, an individual utterance of a person appearing in a moving image, or an individual phrase of, for example, a song or a poem.

The voice storage data is only required to be data that can output voices by being reproduced, and may be, for example, moving image data storing images and voices, or voice data that does not contain images. Various known formats may be employed as the data format and compression format of the moving image data and voice data. Examples of such formats include the avi format, the mpeg format, and the mp3 format. In this embodiment, a description is given of a case in which the voice storage data is moving image data.

When the voice storage data is reproduced, each voice stored in the voice storage data is output in a predetermined order and at a predetermined timing with an elapse of time. In other words, each voice is stored in the voice storage data so that the voice is output in a predetermined order and at a predetermined timing. The output timing of a voice may be any timing in a period during which the voice is output. For example, the timing may indicate a timing of starting to output the voice, a timing of ending output of the voice, or an intermediate timing thereof.

2-2. Timing Data Acquisition Module

The controller 11 mainly implements the timing data acquisition module 101. The timing data acquisition module 101 acquires timing data on provisional display timings of a plurality of pieces of character information, which are displayed sequentially during reproduction of the voice storage data and represent content of respective voices. In this embodiment, a description is given of a case in which the timing data acquisition module 101 acquires timing data from the data storage 102 described later, but when the timing data is stored in a computer other than the server 10, the timing data acquisition module 101 may acquire the timing data from the computer.

The character information represents content of the voice as at least one character, and for example, may be text such as subtitles, captions, or superimposed text. The character information may be formed of only one character, or may be a character string containing a plurality of characters. Further, the character information may contain symbols other than characters. Content of the character information is not required to be completely the same content as that of the voice word for word, and there may be some degree of difference between content of the voice and content of the character information. In this embodiment, a description is given of a case in which the voice storage data is moving image data, namely, a case in which the character information represents subtitles of a moving image.

FIG. 4 is a table for showing an example of storing timing data. As shown in FIG. 4, the timing data stores a character information ID for uniquely identifying character information, a display timing of the character information, and the character information. The character information may be stored in data different from the timing data.

The display timing stored in the timing data may represent any timing in a period during which the character information is displayed. For example, the display timing may indicate a timing of starting to display the character information, a timing of ending display of the character information, or an intermediate timing thereof. In this embodiment, a description is given of a case in which the start timing is used as the display timing. However, as shown in FIG. 4, the end timing and the length of a display time may also be stored in the timing data. The length of the display time may be different depending on the character information, or may be the same for all the pieces of character information.

The display timing set in advance in the timing data is adjusted by the display timing determination module 104 described later, and thus, in this embodiment, the display timing before adjustment is referred to as "provisional display timing", and the display timing after adjustment is referred to as "definitive display timing". The display timing determination module 104 described later changes the provisional display timing, and finds such a definitive display timing as to match the output timing of a voice in an overall manner.

In the following, the character information is denoted by i (i is an integer of from 1 to $N_i$, where $N_i$ represents a total number of pieces of character information), and a set of provisional display timings stored in the timing data is denoted by $\{x_i\}$. For example, as shown in FIG. 4, when the character information ID is assigned from 1 to each piece of character information in chronological order, the value of i represents the character information ID. As described above, in this embodiment, the timing of starting to display the character information i is the provisional display timing $x_i$ of the character information i.

2-3. Data Storage

The storage 12 mainly implements the data storage 102. The data storage 102 stores voice storage data and timing data. In this embodiment, the data storage 102 prepares a piece of timing data for each piece of voice storage data, and thus the data storage 102 stores a combination of those pieces of data. The data storage 102 may store data other than the voice storage data.

2-4. Waveform Analysis Module

The controller 11 mainly implements the waveform analysis module 103. The waveform analysis module 103 analyzes the voice waveform of the voice storage data to acquire the output timing of each voice. For example, the waveform analysis module 103 generates a spectrogram that chronologically represents the strength of a signal for each frequency based on the voice storage data. The spectrogram may be generated using a known sonograph, and for example, a band-pass filter or a short-time Fourier transform may be used. The sonograph is a general term for a device with an algorithm of generating a spectrogram. The waveform analysis module 103 acquires a temporal change in strength (amplitude) indicated by the voice waveform for each frequency to generate a spectrogram.

Figure 5:
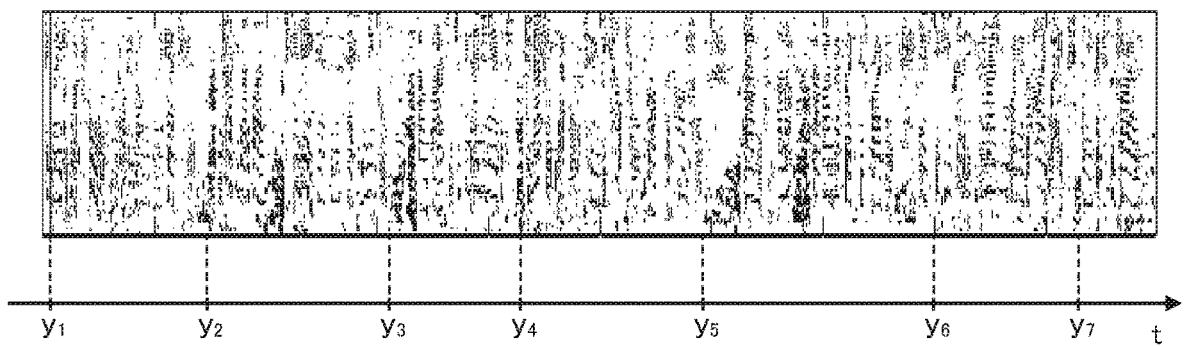
FIG. 5 is a diagram for illustrating an example of a spectrogram.

FIG. 5 is a diagram for illustrating an example of the spectrogram. In the spectrogram of FIG. 5, the vertical axis represents a frequency, and the horizontal axis represents time. The spectrogram often represents the strength of a signal of each frequency by color, but in FIG. 5, schematically represents the strength of a signal of each frequency in monochrome. In the example of FIG. 5, a darker frequency band represents a stronger intensity of sound, and a lighter frequency band represents a weaker intensity of sound.

The waveform analysis module 103 executes deep learning (type of machine learning) that is based on the spectrogram to acquire the output timing of each voice. The pattern information representing a characteristic of a voice required for deep learning may be stored in the data storage 102. For example, when the intensity of a frequency band (e.g., 100 Hz to several thousands of Hz) corresponding to a voice is equal to or larger than a threshold value, it is determined that the voice is being output, whereas when the intensity of the frequency band is smaller than the threshold value, it is determined that the voice is not being output. The frequency band corresponding to the voice may be designated in advance, and may be variable depending on input by a system administrator.

For example, when the state of a voice not being output changes to the state of a voice being output, the waveform analysis module 103 issues a voice ID for uniquely identifying the voice, and determines this timing of change as a timing of starting to output the voice identified by the voice ID. Then, when the state of the voice being output changes to the state of the voice not being output, the waveform analysis module 103 determines this timing of change as a timing of ending output of the voice identified by the voice ID. A period of time from the start timing to the end timing is a period during which the voice identified by the voice ID is output. As described above, in this embodiment, a description is given of a case in which the timing of starting to output a voice is used as the output timing of the voice. However, the end timing and the length of the output period may also be held.

In the following, the voice is denoted by j (j is an integer of from 1 to $N_j$, where $N_j$ is a total number of voices), and a set of output timings is denoted by $\{y_j\}$. For example, when the voice ID is assigned from 1 to each voice in chronological order, the value of j represents the voice ID. In this embodiment, the start timing is used as the output timing, and thus the timing of starting to output the voice j is the timing $y_j$ of outputting the voice j.

2-5. Display Timing Determination Module

The controller 11 mainly implements the display timing determination module 104. The display timing determination module 104 determines the definitive display timing of each piece of character information based on the output timing $\{y_j\}$ of each voice acquired by the waveform analysis module 103 and the provisional display timing $\{x_i\}$ of each piece of character information determined based on the timing data.

The display timing determination module 104 acquires match degree information based on the output timing $\{y_j\}$ of each voice and the provisional display timing $\{x_i\}$ of each piece of character information, to thereby determine the definitive display timing by changing the provisional display timing $\{x_i\}$ so that a degree of matching indicated by the match degree information becomes higher. The match degree information is an indication of the degree of matching in terms of timing. In other words, the match degree information is an indication of the amount of deviation in timing. The match degree information may indicate the degree of matching between the output timing $\{y_j\}$ of each voice and the provisional display timing $\{x_i\}$ of each piece of character information before or after the provisional display timing $\{x_i\}$ is changed by a change amount described later.

For example, it is indicated that, as the degree of matching indicated by the match degree information becomes higher (that is, as degree of deviation indicated by the degree of matching becomes smaller), the timings are closer to each other, whereas, as the degree of matching indicated by the match degree information becomes lower (that is, as degree of deviation indicated by the degree of matching becomes larger), the timings are farther from each other. The match degree information is indicated by a numerical value. The match degree information is calculated based on a difference in time between the output timing $\{y_j\}$ and the provisional display timing $\{x_i\}$, that is, based on a mathematical expression that uses those timings as variables. This mathematical expression is stored in the data storage 102.

For example, the display timing determination module 104 acquires a plurality of change amounts of the provisional display timing of each piece of character information, and selects a change amount having the highest degree of matching indicated by the match degree information from among the plurality of change amounts. This change amount is a movement amount of the provisional display timing $\{x_i\}$ in terms of timing, and indicates how much the provisional display timing $\{x_i\}$ is caused to move forward or backward in terms of time. The change amount may be different depending on the character information, or the same change amount may be used among all the pieces of character information. In this embodiment, a description is given of a case in which the same change amount is used among all the pieces of character information. The change amount may be indicated by at least one value, and for example, coefficients a and b of Expression 1 given below may be used as the change amount.

$$T(x_i)=ax_i+b \quad \text{[Expression 1]}$$

The left side of Expression 1 indicates a provisional display timing obtained by being changed by the coefficients a and b, which are change amounts. That is, $T(x_i)$ is a candidate for the definitive display timing. The coefficient a of the right side of Expression 1 is an amount of change in interval between the provisional display timings $\{x_1\}$. When the coefficient a is changed to a larger value, the display time of the entire character information extends, and thus the coefficient a indicates a scale of the character information. Meanwhile, the coefficient b is a movement amount in a case where the provisional display timing $\{x_i\}$ is shifted in an overall manner. When the coefficient b is changed, the character information moves forward or backward in an overall manner, and thus the coefficient b indicates a parallel movement amount.

As described above, the display timing determination module 104 acquires a plurality of combinations of the coefficients a and b, which are change amounts of the provisional display timing $\{x_i\}$. The plurality of combinations are different from one another in value of at least one of the coefficients a and b. A known sample extraction method can be employed as the method of acquiring the combination of coefficients a and b. For example, the combination of coefficients a and b may be extracted based on the random sample consensus algorithm (RANSAC), or the combination of coefficients a and b may be designated by a system administrator in advance. The number of acquired combinations may be freely selected, and for example, tens to hundreds of samples may be extracted.

The display timing determination module 104 acquires, for each change amount, the match degree information indivating a degree of matching between the provisional display timing {T(x$_i$)} of each piece of character information obtained by being changed by the change amount and the output timing {y$_j$} of each voice. The match degree information is calculated based on a mathematical expression that uses the changed provisional display timing {T(x$_i$)} and the output timing {y$_j$} as variables. The mathematical expression is assumed to be stored in the data storage 102. In this embodiment, Expression 2 is given below as an example.

$$D(T) = \sum_i \min_j d_1(y_j, T(x_i)) + \sum_j \min_i d_2(y_j, T(x_i))$$ [Expression 2]

The left side of Expression 2 is the match degree information. The match degree information D is changed by the coefficients a and b, which are change amounts, and thus a provisional display timing T of each piece of character information, which is obtained by being changed by those change amounts, serves as a variable. Thus, the match degree information D is calculated for each combination of coefficients a and b, which are change amounts.

Further, as indicated by the first term in the right side of Expression 2, the display timing determination module 104 acquires, for each piece of character information, an individual piece of match degree information d$_1$ indicationg a degree of matching between a provisional display timing T(x$_i$) of the piece of character information and the output timing {y$_j$} closest to the provisional display timing T(x$_i$). For example, the display timing determination module 104 acquires, for each provisional display timing T(x$_i$) obtained by being changed by a certain change amount, a distance (namely, time difference) between the provisional display timing T(x$_i$) and the output timing {y$_j$} closest to the provisional display timing T(x$_1$) as the individual piece of match degree information d$_1$. Then, the display timing determination module 104 calculates the sum of the individual pieces of match degree information d$_1$.

Further, for example, as indicated by the second term of the right side of Expression 2, the display timing determination module 104 acquires, for each voice, an individual piece of match degree information d$_2$ indicating the degree of matching between the output timing {y$_j$} of the voice and the provisional display timing T(x$_i$) of the character information closest to the output timing {y$_j$}. For example, the display timing determination module 104 acquires, for each output timing {y$_j$} of the voice, a distance (namely, time difference) between the output timing {y$_j$} and the provisional display timing T(x$_i$), which is obtained by being changed by a certain change amount and is closest to the output timing {y$_j$}, as the individual piece of match degree information d$_2$. Then, the display timing determination module 104 calculates the sum of the individual pieces of match degree information d$_2$.

As shown in Expression 2, the display timing determination module 104 acquires the sum (first term in right side) of the individual pieces of match degree information d$_1$ acquired for each piece of character information and the sum (second term in right side) of the individual pieces of match degree information d$_2$ acquired for each voice. The match degree information indicated in the left side indicates the degree of overall match of timings, and thus is hereinafter referred to as "overall match degree information D". That is, the overall match degree information D is information indicating the degree of overall match of timings. It is indicated that, as the value of the match degree information D becomes smaller, the degree of matching becomes higher (deviation becomes smaller), whereas as the value of the match degree information D becomes larger, the degree of matching becomes lower (deviation becomes larger).

For example, the display timing determination module 104 determines the definitive display timing for each piece of character information based on the change amount having the highest degree of matching indicated by the match degree information D. In this embodiment, the display timing determination module 104 acquires, as the definitive display timing, the provisional display timing T(x$_i$) obtained by being changed based on a combination (having highest degree of matching) with the smallest value of the overall match degree information D among combinations of the coefficients a and b.

Further, for example, in this embodiment, the individual piece of match degree information d$_1$ is acquired for each piece of character information, and thus the display timing determination module 104 determines the definitive display timing for each piece of character information based on the individual piece of match degree information d$_1$ acquired for each piece of character information. Further, for example, in this embodiment, the individual piece of match degree information d$_2$ is acquired for each voice, and thus the display timing determination module 104 determines the definitive display timing for each piece of character information based on the individual piece of match degree information d$_2$ acquired for each voice.

Figure 6:
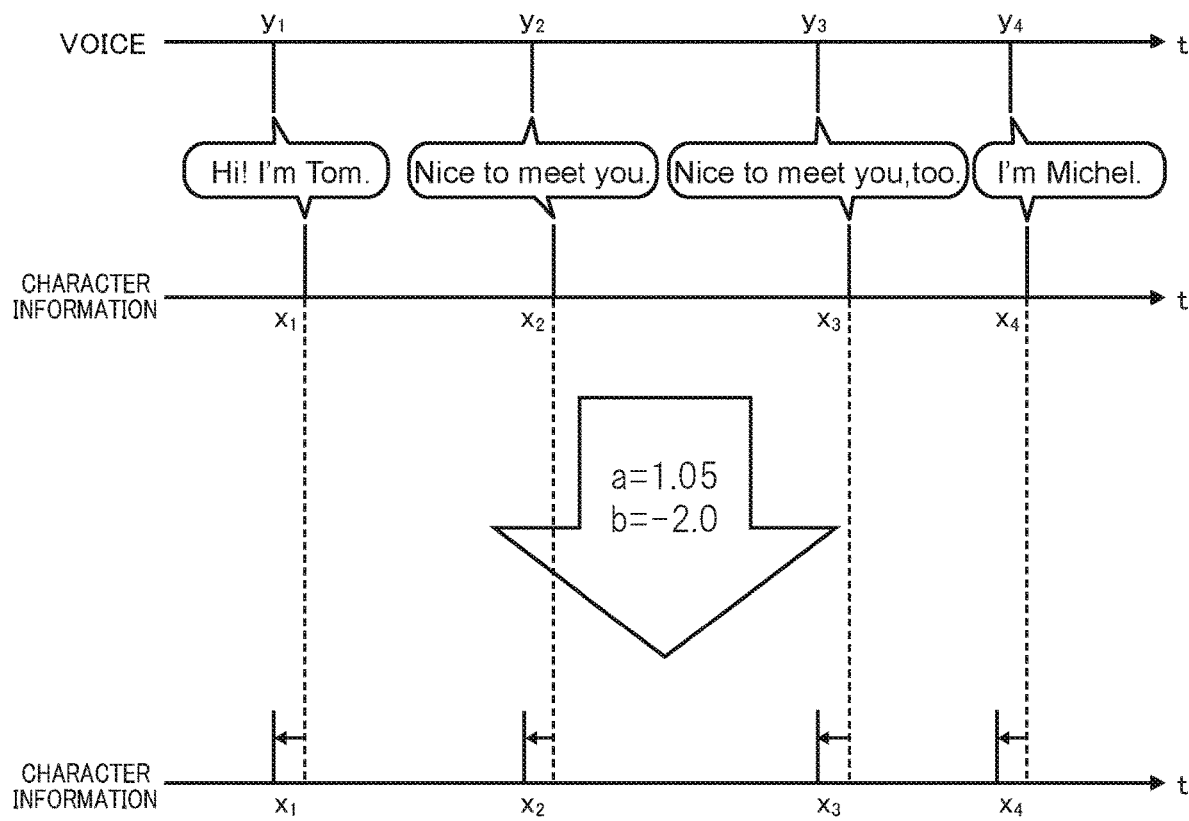
FIG. 6 is a diagram for illustrating how a definitive display timing is acquired.

FIG. 6 is a diagram for illustrating how the definitive display timing is acquired. The t-axis of FIG. 6 is a time axis, and indicates output timings y$_1$ to y$_4$ of apart of voices and display timings x$_1$ to x$_4$ of a part of the character information. For example, when the coefficient a is 1.05 and the coefficient b is −2.0 among various combinations of coefficients a and b, the degree of matching indicated by the overall match degree information D becomes the highest. As illustrated in FIG. 6, even when there is deviation between the output timing {y$_j$} of the voice and the provisional display timing {x$_i$} of each piece of character information, the provisional display timing {x$_i$} is changed by the overall match degree information D having the highest degree of matching, to thereby reduce the deviation in timing.

In this embodiment, a description is given of a case in which the start timing of each piece of character information corresponds to the display timing thereof. However, the display timing determination module 104 may also change the end timing and display time of each piece of character information in accordance with change in start timing. For example, the display timing determination module 104 may change the end timing and display time based on the change amount having the highest degree of matching indicated by the overall match degree information D. Further, the display timing determination module 104 may deviate the end timing by the same amount as that of the start timing obtained by being changed without changing the display time.

3. Processing to be Executed in this Embodiment

Figure 7:
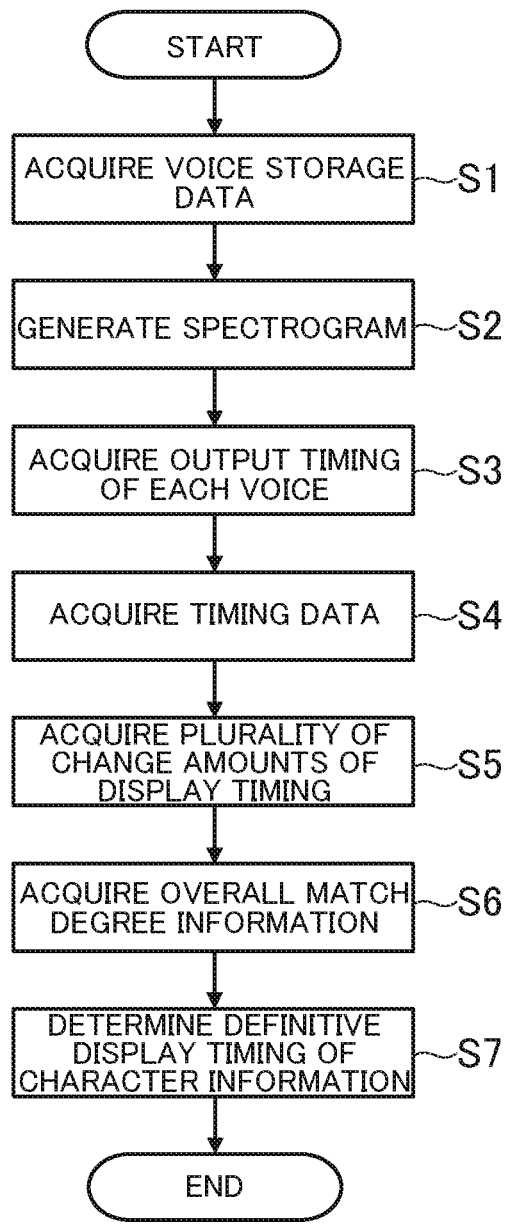
FIG. 7 is a flowchart for illustrating an example of processing to be executed by a server.

FIG. 7 is a flowchart for illustrating an example of processing to be executed by the server 10. The processing illustrated in FIG. 7 is an example of processing to be executed by the functional blocks illustrated FIG. 3, and is executed by the controller 11 operating in accordance with a program stored in the storage 12. The processing illustrated in FIG. 7 may be executed when a predetermined condition is satisfied. For example, the processing illustrated in FIG. 7 may be executed when the voice storage data and timing data are registered with the server 10, or may be executed at any timing, for example, instruction by a system administrator.

As illustrated in FIG. 7, first, the controller 11 acquires voice storage data stored in the storage 12 (Step S1). The controller 11 generates a spectrogram based on the voice storage data acquired in Step S1 (Step S2). In Step S2, as described above, the controller 11 uses a sonograph to perform frequency analysis for the voice storage data to chronologically acquire the strength of a signal for each frequency, to thereby generate a spectrogram.

The controller 11 acquires the output timing $\{y_j\}$ of each voice based on the spectrogram generated in Step S2 (Step S3). In Step S3, the controller 11 acquires the start timing at which the voice starts to be output by retrieving a time at which the strength of a sound in a predetermined frequency band is equal to or larger than a threshold value in chronological order from the beginning of the reproduction time of the voice storage data. When the controller 11 acquires the start timing of the first voice, the controller 11 assigns the voice with a voice ID=1. Next, the controller 11 retrieves a time at which the intensity of a sound in a predetermined frequency band is smaller than the threshold value, to thereby acquire the end timing at which output of the voice is ended. When the controller 11 acquires the end timing of the first voice, the storage 12 may hold the end timing and an output period of the first voice. After that, the controller 11 repeats the above-mentioned processing until the end of the reproduction time of the voice storage data, and increments the voice ID each time the start timing of the voice is found to cause the storage 12 to hold the start timing and other data.

The controller 11 acquires the timing data stored in the storage 12 (Step S4). The controller 11 acquires a plurality of change amounts of the display timing of the character information (Step S5). In Step S5, as described above, the controller 11 uses the RANSAC algorithm to acquire a fixed number or more of combinations of the coefficients a and b.

The controller 11 acquires the overall match degree information D for each change amount acquired in Step S5 (Step S6). In Step S6, the controller 11 uses Expressions 1 and 2 given above to acquire the overall match degree information D for each change amount, and causes the storage 12 to hold the overall match degree information D.

The controller 11 determines the definitive display timing of the character information based on the overall match degree information D (Step S7), and ends the processing. In Step S7, the controller 11 updates the timing data so that the provisional display timing $T(x_i)$, which is obtained by being changed by a change amount having the highest degree of matching indicated by the overall match degree information, becomes the definitive display timing. That is, the controller 11 overwrites the timing data based on the provisional display timing $T(x_1)$, which is obtained by being changed by the change amount. With this, the server 10 can execute reproduction of the voice storage data and control of display of the character information based on the voice storage data and the timing data at which the definitive display timing is determined.

According to the display timing determination system 1 described above, the definitive display timing of each piece of character information is determined based on the output timing of each voice obtained by analysis of the voice waveform in the voice storage data and the provisional display timing of each piece of character information. Thus, the output timing of a voice and the display timing of a character can be synchronized with each other. The voice waveform can be analyzed as long as there is voice storage data, and thus, for example, even when there is no such information as the genre code of a TV program, the output timing of a voice and the display timing of a character can be synchronized with each other. In other words, even the voice storage data without the genre code of a TV program enables synchronization of the output timing of a voice and the display timing of a character.

Further, the display timing determination system 1 determines the definitive display timing based on a change amount having the highest degree of matching in terms of timing among a plurality of change amounts of the provisional display timing. That is, the display timing determination system 1 determines the change amount (change amount common in pieces of character information) that adjusts the timing in an overall manner without calculating separate change amounts for respective pieces of character information. Therefore, it is possible to quickly acquire the display timing that adjusts the timing while alleviating a processing load on the server 10 with simpler processing.

Further, it is possible to determine the definitive display timing of character information in consideration of individual match degrees of the display timings of the character information by acquiring an individual piece of match degree information $d_1$ for each piece of character information. With this, it is possible to improve the accuracy of adjusting timings of the voice and the character information.

Further, it is possible to determine the definitive display timing of character information in consideration of individual match degrees of the output timings of the voice by acquiring an individual piece of match degree information $d_2$ for each voice. With this, it is possible to improve the accuracy of adjusting timings of the voice and the character information.

4. Modification Examples

The present invention is not limited to the embodiment described above, and can be modified suitably without departing from the spirit of the present invention.

(1) For example, in the embodiment, the individual pieces of match degree information $d_1$ are acquired for all the pieces of character information, but when character information indicating information other than a voice is contained in a plurality of pieces of character information for which the provisional display timings $\{x_i\}$ are stored in the timing data, there is no corresponding voice. Thus, the individual piece of match degree information $d_1$ may not be acquired for such character information.

The character information representing information other than a voice is character information having no corresponding voice, and is, for example, a description, a title, or notes. For example, when the voice storage data is moving image data, the name of a location shown in the moving image, the role or name of a character, the role name, or the titles of a movie, a TV program, an animation, and a song correspond to character information representing information other than a voice. When there is such character information, the display timing of the character information is required to be identified also for the character information, and thus the provisional display timing of the character information is also stored in the timing data.

Figure 8:
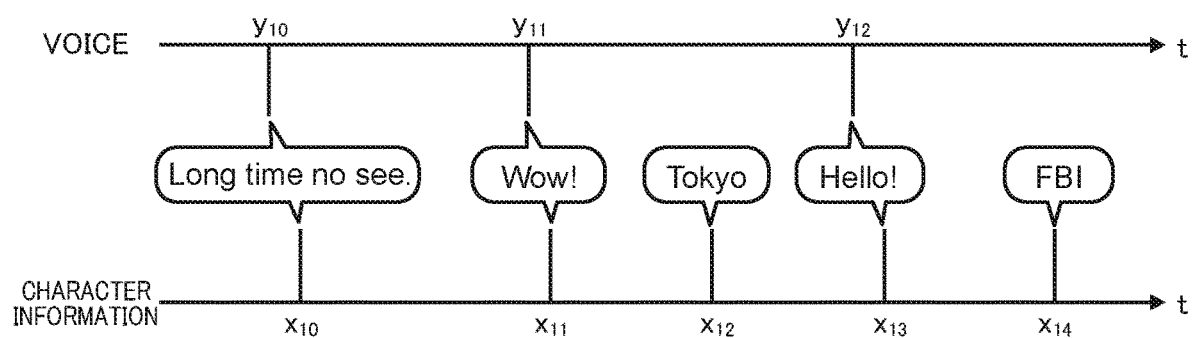
FIG. 8 is a diagram for illustrating a provisional display timing of character information representing information other than a voice.

FIG. 8 is a diagram for illustrating a provisional display timing of character information representing information other than a voice. As illustrated in FIG. 8, pieces of character information for which the provisional display timings are $x_{12}$ and $x_{14}$ are descriptions of a location in the moving image or a role of a character, and there is no output timing of a voice within a predetermined period. Thus, there is no corresponding voice. Such character information does not have the corresponding voice in the first place and the timing is not required to be adjusted, and hence acquisition of the individual piece of match degree information $d_1$ produces a noise. Thus, the display timing determination module 104 excludes a character indicating information other than a voice from the acquisition target of the individual piece of match degree information $d_1$.

For example, the display timing determination module 104 determines whether or not there is an output timing $\{y_j\}$ within a predetermined period of a provisional display timing $\{x_i\}$. The display timing determination module 104 determines a provisional display timing $\{x_i\}$ for which there is an output timing $\{y_i\}$ within a predetermined period as having a corresponding voice, or determines a provisional display timing $\{x_i\}$ for which there is no output timing $\{y_j\}$ within a predetermined period as not having a corresponding voice. The display timing determination module 104 acquires the individual pieces of match degree information $d_1$ using a similar method described in the embodiment only for the pieces of character information having corresponding voices, and does not acquire the individual piece of match degree information $d_1$ for a piece of character information having no corresponding voice.

According to the modification example (1), a character indicating information other than a voice is excluded from the acquisition target of the individual piece of match degree information $d_1$, and thus it is possible to reduce a noise, which is caused at the time of determining the degree of matching timings, and improve the accuracy of synchronizing timings of the voice and character information.

(2) Further, for example, in the embodiment, the individual pieces of match degree information $d_2$ are acquired for all the voices, but when a voice that does not have corresponding character information is contained among a plurality of voices stored in the voice storage data, the individual piece of match degree information $d_2$ may not be acquired.

A voice that does not have corresponding character information is a voice that does not have character information indicated by the voice. Examples of such a voice include an interjection, a response, a shout, or a scream. In other words, a voice that does not have a corresponding character is a voice for which character information is not displayed when the voice is output. Analysis of the voice waveform does not depend on whether or not there is corresponding character information, and thus the waveform analysis module 103 acquires the output timing of a voice even when the voice does not have a corresponding character.

Figure 9:
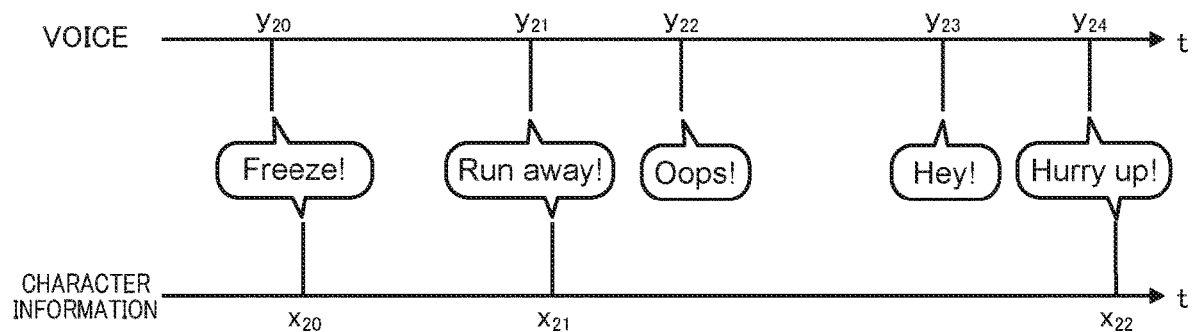
FIG. 9 is a diagram for illustrating a output timing of a voice that does not have a corresponding character.

FIG. 9 is a diagram for illustrating an output timing of a voice that does not have a corresponding character. As illustrated in FIG. 9, voices having output timings of $y_{22}$ and $y_{23}$ are, for example, interjections and calling, and there is no corresponding character information. Such voices do not have character information for which the timing is to be adjusted in the first place, and hence acquisition of the individual piece of match degree information $d_2$ produces a noise. Thus, the display timing determination module 104 excludes a voice having no corresponding character from the acquisition target of the individual piece of match degree information $d_2$.

For example, the display timing determination module 104 determines whether or not there is a provisional display timing $\{x_j\}$ within a predetermined period of an output timing $\{y_i\}$. The display timing determination module 104 determines an output timing $\{y_i\}$ for which there is a provisional display timing $\{x_i\}$ within a predetermined period as having corresponding character information, or determines an output timing $\{y_i\}$ for which there is no provisional display timing $\{x_j\}$ within a predetermined period as not having corresponding character information. The display timing determination module 104 acquires the individual pieces of match degree information $d_2$ using a similar method described in the embodiment only for the voices having corresponding character information, and does not acquire the individual piece of match degree information $d_2$ for apiece of character information having no corresponding character information.

According to the modification example (2), a voice having no corresponding character information is excluded from the acquisition target of the individual piece of match degree information $d_2$, and thus it is possible to reduce a noise, which is caused at the time of determining the degree of matching timings, and improve the accuracy of synchronizing timings of the voice and character information.

(3) Further, for example, when there is no character information corresponding to a voice or no voice corresponding to character information, there may be individual pieces of match degree information $d_1$ and $d_2$ having extremely large deviation in timing. In a case where such individual pieces of match degree information $d_1$ and $d_2$ are added to acquire the overall match degree information D, even when timings of the other parts match one another, the entire timing does not match as a whole. Thus, regarding the individual pieces of match degree information $d_1$ and $d_2$ having a certain amount or more of deviation, the overall match degree information D may be calculated after reduction of the deviation.

In this modification example too, as described in the embodiment, the display timing determination module 104 determines the definitive display timing of each character based on the overall match degree information D relating to the overall degree of matching defined by the individual pieces of match degree information $d_1$ and $d_2$. At this time, the display timing determination module 104 in this modification example acquires the overall match degree information D by increasing the degree of matching for the individual pieces of match degree information $d_1$ and $d_2$ having a degree of matching smaller than the threshold value.

For example, when the values of the individual pieces of match degree information $d_1$ and $d_2$ are smaller than the threshold value (namely, when a degree of matching is equal to larger than threshold value), Expression 3 given below is used to acquire the definitive individual pieces of match degree information $d_1$ and $d_2$, and when the values of the individual pieces of match degree information $d_1$ and $d_2$ are equal to or larger than the threshold value (namely, when a degree of matching is smaller than threshold value), Expression 4 given below is used to acquire the definitive individual pieces of match degree information $d_1$ and $d_2$ again. In Expressions 3 and 4 given below, the individual pieces of match degree information $d_1$ and $d_2$ are denoted by d, and the threshold value is denoted by c.

$$d = \frac{d^2}{2c} \quad \text{[Expression 3]}$$

$$d = |x| - \frac{c}{2} \quad \text{[Expression 4]}$$

The method of increasing the degree of matching indicated by the individual pieces of match degree information $d_1$ and $d_2$ by the display timing determination module 104 is not limited to Expressions 3 and 4. The display timing determination module 104 is only required to change the individual pieces of match degree information $d_1$ and $d_2$ for which the degree of matching is smaller than the threshold value so as to increase the degree of matching. For example, the change amount may be calculated by a mathematical expression that uses the individual pieces of match degree information $d_1$ and $d_2$ as variables, or the individual pieces of match degree information $d_1$ and $d_2$ may automatically be set to a predetermined value. The display timing determination module 104 is only required to increase the degree of matching between the individual pieces of match degree information $d_1$ and $d_2$ for which the degree of matching is smaller than the threshold value so as to reduce an influence on the overall match degree information D by those individual pieces of match degree information $d_1$ and $d_2$.

According to the modification example (3), regarding the individual pieces of match degree information $d_1$ and $d_2$ for which the degree of matching is smaller than the threshold value, the overall match degree information D is acquired after the degree of matching is increased. Thus, it is possible to prevent some individual pieces of match degree information $d_1$ and $d_2$ for which the degree of matching is low from causing overall mismatch of timings. As a result, it is possible to improve the accuracy of synchronizing timings of the voice and character information.

(4) Further, for example, when a plurality of sounds including a plurality of voices and sounds other than voices are stored in the voice storage data, it is possible to predict whether each sound indicates a voice or another sound based on the tendency of a waveform pattern. Thus, the overall match degree information D may be acquired in consideration of a probability that the sound is a voice. In this modification example, the method of acquiring the output timing of each of a plurality of sounds stored in the voice storage data by the waveform analysis module 103 may be similar to the method described in the embodiment.

The display timing determination module 104 acquires, for each sound, probability information on a probability that the sound is a voice. The display timing determination module 104 acquires probability information by analyzing the voice waveform of voice storage data. A known method may be employed as the method of acquiring probability information, and for example, voice activity detection (VAD) classification may be used. For example, a basic pattern of the voice waveform may be stored in the data storage 102 in advance, and the display timing determination module 104 may acquire the probability information based on the degree of matching between the basic pattern and the voice waveform indicated by the voice storage data. The probability information is indicated by a numerical value, and for example, may be indicated by a numerical value of 0 or more and 1 or less. In this case, it is indicated that, as the value indicated by the probability information becomes closer to 0, the possibility that the sound is a voice becomes lower, whereas as the value indicated by the probability information becomes closer to 1, the possibility that the sound is a voice becomes higher.

The display timing determination module 104 determines the definitive display timing of each piece of character information based on the additional probability information acquired for each sound. For example, the display timing determination module 104 may acquire the overall match degree information D based on Expression 5 given below. In Expression 5 given below, the probability information is indicated by $c(y_j)$. The method of determining the definitive display timing based on the overall match degree information D is similar to the one described in the embodiment.

$$D(T) = \sum_i \min_j c(y_j) d_1(y_j, T(x_i)) + \sum_j \min_i c(y_j) d_2(y_j, T(x_i)) \quad \text{[Expression 5]}$$

The method of determining the definitive display timing of character information based on the probability information by the display timing determination module 104 is not limited to the above-mentioned example. For example, a mathematical expression other than Expression 5 may be used, and the display timing determination module 104 may decrease the influence on the overall match degree information D by the individual pieces of match degree information $d_1$ and $d_2$ that are based on a voice with low probability information, whereas the display timing determination module 104 may increase the influence on the overall match degree information D by the individual pieces of match degree information $d_1$ and $d_2$ that are based on a voice with high probability information. That is, weighting at the time of acquisition of the overall match degree information D may be performed based on the probability information. In other cases, for example, the display timing determination module 104 may not refer to the output timing of a voice for which the probability information is smaller than the threshold value at the time of calculation of the overall match degree information D.

According to the modification example (4), the definitive display timing of character information is determined through use of probability information on whether or not the sound is a voice, and thus it is possible to improve the accuracy of synchronizing timings of the voice and character information.

(5) Further, for example, in the embodiment, a description has been given of a case in which the overall match degree information D is calculated for all the plurality of change amounts and a change amount having the highest degree of matching is retrieved. However, a change amount that has adjusted timings the best at a certain time point may have a large difference in overall match degree information D with another change amount that has adjusted timings the second best. Thus, retrieval of a change amount may be stopped when such a change amount is found.

As described in the embodiment, also in this modification example, the display timing determination module 104 can acquire the change amount of the provisional display timing of each character repeatedly, and may acquire, for each change amount, the overall match degree information D indicating the degree of overall match of timings between the changed provisional display timing $\{x_i\}$ of each character and the output timing $\{y_j\}$ of each voice.

When a difference between the overall match degree information D having the highest degree of matching and the overall match degree information D having the second highest degree of matching is smaller than a threshold value, the display timing determination module 104 in this modification example acquires a new change amount and the overall match degree information D based on the acquired new change amount. For example, each time the display timing determination module 104 acquires the overall match degree information D, the display timing determination module 104 compares the acquired overall match degree information D with the overall match degree information D acquired in the past to determine whether or not the degree of matching therebetween is the highest. Then, when the display timing determination module 104 determines that the degree of matching is the highest, the display timing determination module 104 determines whether or not a difference between the latest overall match degree information D (namely, overall match degree information D with highest degree of matching) and the overall match degree information D having the second highest degree of matching is smaller than a threshold value. The threshold value may be a value determined in advance, and may be a fixed value or a variable value. When the difference is smaller than the threshold value, the display timing determination module 104 acquires the overall match degree information D corresponding to the next change amount similarly to the method described in the embodiment.

On the other hand, when the difference is equal to or larger than the threshold value, the display timing determination module 104 does not acquire a new change amount, and determines the definitive display timing of each piece of character information based on the change amount corresponding to the overall match degree information D having the lowest degree of matching. That is, when there is overall match degree information D with the difference of the threshold value or more, the display timing determination module 104 does not execute acquisition of the overall match degree information D any more, and determines the definitive display timing based on the overall match degree information D having the highest degree of matching at that time. In a case where the difference is not equal to or larger than the threshold value even when the overall match degree information D is acquired for all the change amounts, the display timing determination module 104 may determine the definitive display timing based on the change amount corresponding to the overall match degree information D having the highest degree of matching at that time.

According to the modification example (5), acquisition of the change amount is stopped when a change amount that has adjusted timings to some extent is found. As a result, unnecessary processing is not required to be executed, and thus the definitive display timing can be found more quickly and the processing load on the server 10 can be reduced.

(6) Further, for example, it is possible to identify whether a speaker of a voice is a man or a woman based on the tendency of a waveform pattern of each voice. Each piece of character information may be recorded in association with the sex of the voice, and the display timing of each piece of character information may be determined through use of information on the speaker.

Figure 10:
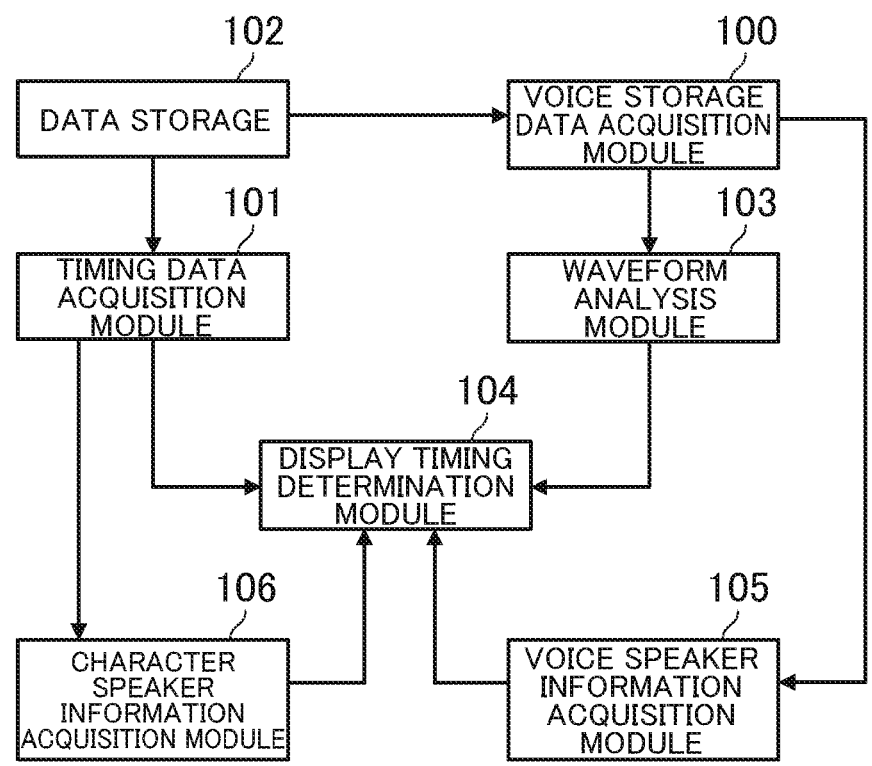
FIG. 10 is a functional block diagram in a modification example of the present invention.

FIG. 10 is a functional block diagram in a modification example of the present invention. As illustrated in FIG. 10, in the modification example, a voice speaker information acquisition module 105 and a character speaker information acquisition module 106 are implemented in addition to the functions described in the embodiment. The controller 11 mainly implements those modules.

The voice speaker information acquisition module 105 is configured to acquire voice speaker information on a speaker corresponding to each voice. The voice speaker information indicates the characteristic of a speaker of a voice, such as the sex or age of a speaker. A description is given of a case in which the voice speaker information indicates the sex of a speaker. The voice of a man has a frequency lower than the voice of a woman, and thus the voice speaker information acquisition module 105 may acquire the voice speaker information based on the frequency of a voice indicated by the spectrogram.

The character speaker information acquisition module 106 is configured to acquire character speaker information on a speaker of each voice. The character speaker information indicates the characteristic of the speaker of a voice indicated by the character information, and is, for example, the sex or age of the speaker. A description is given of a case in which the character speaker information indicates the sex of the speaker. The character speaker information acquisition module 106 may acquire character speaker information designated by an inputter of the character information. In this case, the character speaker information may be stored in timing data in association with the character information ID.

The display timing determination module 104 determines the definitive display timing of each piece of character information based additionally on the voice speaker information on each voice and the character speaker information on each piece of character information. For example, when the display timing determination module 104 retrieves an output timing to be compared with the provisional display timing of each piece of character information, the display timing determination module 104 identifies an output timing for which the character speaker information of the character information and the voice speaker information match each other. Then, the display timing determination module 104 compares the identified output timing with the provisional display timing.

According to the modification example (6), the voice speaker information and the character speaker information are used to easily find an association relationship between the voice and the character information. Therefore, it is possible to improve the accuracy of synchronizing timings of the voice and character information.

(7) Further, for example, in the embodiment and the modification examples, the output timing of a voice and the display timing of character information are set to the respective start timings thereof. However, other information may be used to identify the output timing of a voice and the display timing of character information. For example, a time difference between output timings of a voice and a time difference between display timings of character information may be stored into a first array and a second array, respectively, so that the output timing of a voice and the display timing of character information can be identified. In this case, the display timing determination module 104 determines the definitive display timing of each piece of character information by changing the time difference stored in the second array.

Further, for example, the overall match degree information D is only required to indicate the degree of overall match of timings, and may not indicate the total sum of time differences, but indicate the number of pieces of character information or voices for which deviation in timing is smaller than a threshold value. Further, for example, in the embodiment, a description is given of a case of acquiring a plurality of change amounts and acquiring the overall match degree information D for each change amount. However, the definitive display timing of each piece of character information may be determined based on other methods. For example, the display timing determination module 104 may change the provisional display timing $\{x_i\}$ of each piece of character information so that the provisional display timing $\{x_i\}$ matches the output timing $\{y_j\}$ of the closest voice or deviation therebetween becomes smaller than the threshold value. That is, the display timing determination module 104 may change the provisional display timing $\{x_i\}$ of each piece of character information based not on the amount of change of the overall timing, but on the amount of change of an individual timing. In this case, the overall match degree information D may not particularly be acquired.

Further, for example, a description has been given of a case in which the individual piece of match degree information $d_1$ is acquired for each piece of character information. However, only the individual piece of match degree information $d_2$ may be acquired for each voice, or the individual piece of match degree information $d_1$ may be acquired for only a part of pieces of character information that have been randomly selected. Similarly, a description has been given of a case of acquiring the individual piece of match degree information $d_2$ for each voice. However, only the individual piece of match degree information $d_1$ may be acquired for each piece of character information, or the individual piece of match degree information $d_2$ may be acquired for only a part of voices that have been randomly selected.

Further, for example, the user device 20 may implement the voice storage data acquisition module 100, the timing data acquisition module 101, the waveform analysis module 103, and the display timing determination module 104. In this case, the controller 21 mainly implements each function, and the user device corresponds to the display timing determination device according to the present invention. Alternatively, for example, computers other than the server 10 and the user device 20 may implement the voice storage data acquisition module 100, the timing data acquisition module 101, the waveform analysis module 103, and the display timing determination module 104. In this case, the computer corresponds to the display timing determination device according to the present invention.

The invention claimed is:

1. A display timing determination method, comprising:
   acquiring voice storage data storing a plurality of voices to be output sequentially;
   acquiring timing data on provisional display timings of a plurality of pieces of character information, which are to be sequentially displayed during reproduction of the voice storage data, and represent content of the respective plurality of voices;
   analyzing a voice waveform of the voice storage data to acquire an output timing of each of the plurality of voices;
   acquiring a plurality of change amounts of the provisional display timings of the plurality of pieces of character information;
   acquiring, for each of the plurality of change amounts, match degree information on a degree of matching between each of the provisional display timings of the plurality of pieces of character information, which are obtained by being changed by the each of the plurality of change amounts, and the output timing of each of the plurality of voices; and
   determining the definitive display timing of each of the plurality of pieces of character information based on one of the plurality of change amounts having a highest degree of matching indicated by the match degree information.

2. The display timing determination method according to claim 1, wherein the display timing determination method comprises:
   acquiring, for each of the plurality of pieces of character information, an individual piece of match degree information indicating a degree of matching between a provisional display timing of each of the plurality of pieces of character information and the output timing closest to the provisional display timing; and
   determining the definitive display timing of each of the plurality of pieces of character information based on the individual piece of match degree information acquired for each of the plurality of pieces of character information.

3. The display timing determination method according to claim 2,
   wherein the plurality of pieces of character information contain character information indicating information other than a voice, and
   wherein the display liming determination method comprises excluding the character information indicating information other than a voice from an acquisition target of the individual piece of match degree information.

4. The display timing determination method according to claim 1, wherein the display timing determination method comprises:
   acquiring, for each of the plurality of voices, an individual piece of match degree information indicating a degree of matching between an output timing of the each of the plurality of voices and a provisional display timing of one of the plurality of pieces of character information closest to the output timing; and
   determining the definitive display timing of each of the plurality of pieces of character information based on the individual piece of match degree information acquired for each of the plurality of voices.

5. The display timing determination method according to claim 4,
   wherein the voice storage data further stores a voice without a corresponding piece of character information, and
   wherein the display timing determination method comprises excluding the voice without a corresponding piece of character information from an acquisition target of the individual piece of match degree information.

6. The display timing determination method according to claim 1,
   wherein the voice storage data stores a plurality of sounds including the plurality of voices and a sound other than a voice,
   wherein the display timing determination method comprises:
   acquiring an output timing of each of the plurality of sounds stored in the voice storage data;
   acquiring, for each of the plurality of sounds, probability information on a probability that the each of the plurality of sounds is a voice; and
   determining the definitive display timing of each of the plurality of pieces of character information based additionally on the probability information acquired for each of the plurality of sounds.

7. The display timing determination method according to claim 1,
wherein the display timing determination method comprises:
repeatedly acquiring a change amount of the provisional display timings of the plurality of pieces of character information;
acquiring, for each change amount, overall match degree information indicating a degree of overall matching between the provisional display timings of the plurality of pieces of character information, which are obtained by being changed by the each change amount, and output timings of the respective plurality of voices;
acquiring a new change amount when a difference between the overall match degree information having a highest degree of matching and the overall match degree information having a second highest degree of matching is smaller than a threshold value; and
determining, when the difference is equal to or larger than the threshold value, without acquiring the new change amount, the definitive display timing of each of the plurality of pieces of character information based on a change amount corresponding to the overall match degree information having a lowest degree of matching.

8. The display timing determination method according to claim 1, wherein the display timing determination method comprises:
acquiring voice speaker information on a speaker corresponding to each of the plurality of voices;
acquiring character-information speaker information on a speaker corresponding to each of the plurality of pieces of character information;
determining the definitive display timing of each of the plurality of pieces of character information based additionally on the voice speaker information on each of the plurality of voices and the character-information speaker information on each of the plurality of pieces of character information.

9. A display timing determination method, comprising:
acquiring voice storage data storing a plurality of voices to be output sequentially and a sound other than a voice;
acquiring timing data on provisional display timings of a plurality of pieces of character information, which are to be sequentially displayed during reproduction of the voice storage data and represent content of the respective plurality of voices;
analyzing a voice waveform of the voice storage data to acquire an output timing of each of the plurality of sounds stored in the voice storage data;
acquiring, for each of the plurality of sounds, probability information on a probability that the each of the plurality of sounds is a voice; and
determining a definitive display timing of each of the plurality of pieces of character information based on the probability information acquired for each of the plurality of sounds, the output timing of each of the plurality of voices, and the provisional display timing of the respective plurality of pieces of character information determined based on the liming data.

10. A display timing determination method, comprising:
acquiring voice storage data storing a plurality of voices to be output sequentially;
acquiring timing data on provisional display timings of a plurality of pieces of character information, which are to be sequentially displayed during reproduction of the voice storage data and represent content of the respective plurality of voices;
analyzing a voice waveform of the voice storage data to acquire an output timing each of the plurality of voices;
repeatedly acquiring a change amount of the provisional display timings of the plurality of pieces of character information;
acquiring, for each change amount, overall match degree information indicating an overall degree of matching between the provisional display timings of the plurality of pieces of character information, which are obtained by being changed by the each change amount, and output timings of the respective plurality of voices;
acquiring a new change amount when a difference between the overall match degree information having a highest degree of matching and the overall match degree information having a second highest degree of matching match degree is smaller than a threshold value; and
determining, when the difference is equal to or larger than the threshold value, without acquiring the new change amount, the definitive display timing of each of the plurality of pieces of character information based on a change amount corresponding to the overall match degree information having a lowest degree of matching.

11. A display timing determination method, comprising:
acquiring voice storage data storing a plurality of voices to be output sequentially;
acquiring timing data on provisional display timings of a plurality of pieces of character information, which are to be sequentially displayed during reproduction of the voice storage data and represent content of the respective plurality of voices;
analyzing a voice waveform of the voice storage data to acquire an output timing each of the plurality of voices;
acquiring voice speaker information on a speaker corresponding to each of the plurality of voices;
acquiring character-information speaker information on a speaker corresponding to each of the plurality of pieces of character information;
determining the definitive display timing of each of the plurality of pieces of character information based additionally on the voice speaker information on each of the plurality of voices and the character-information speaker information on each of the plurality of pieces of character information.

* * * * *